G. W. Penniston,
Hay Press.
Nº 36,525.      Patented Sep. 23, 1862.
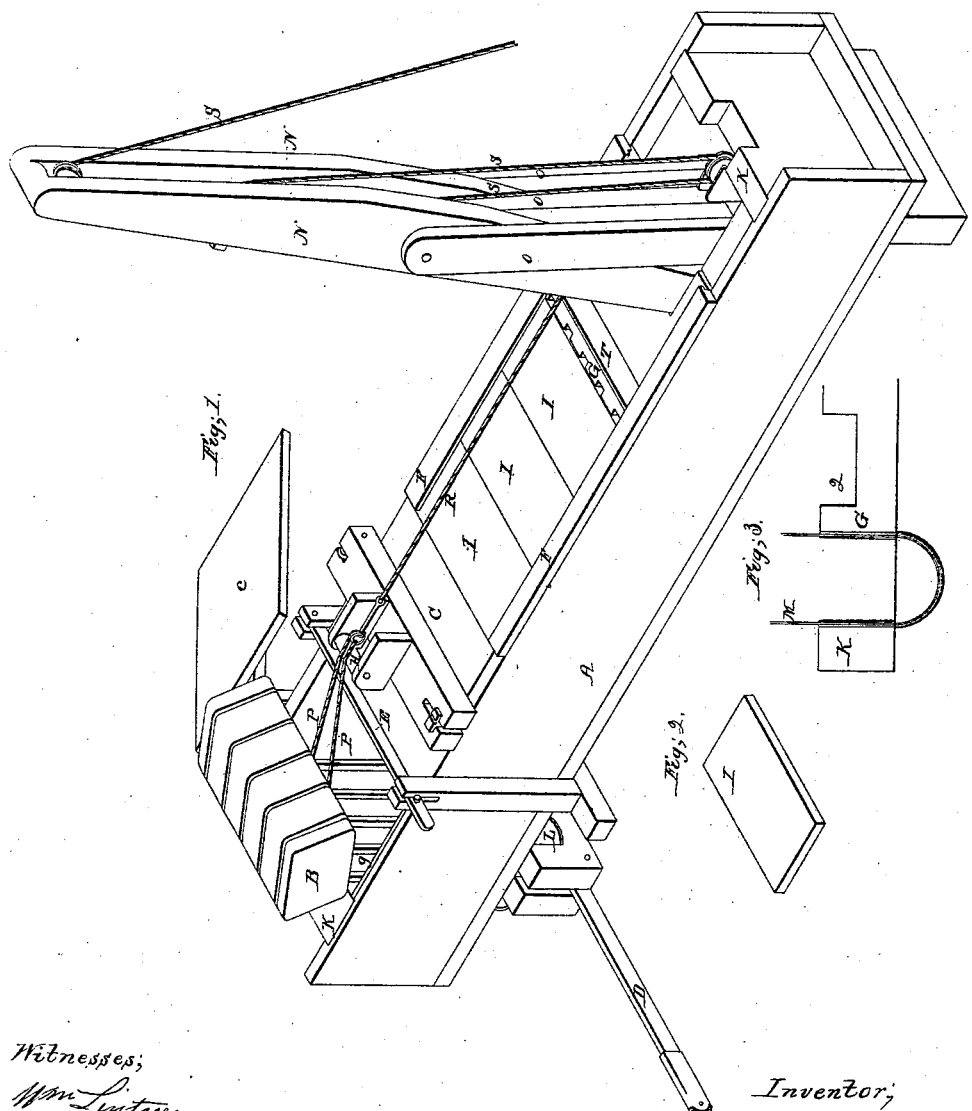
Witnesses:
Inventor;
George W. Penniston

UNITED STATES PATENT OFFICE.

GEORGE W. PENNISTON, OF NORTH VERNON, INDIANA.

IMPROVEMENT IN HAY AND HEMP PRESSES.

Specification forming part of Letters Patent No. 36,525, dated September 23, 1862.

*To all whom it may concern:*

Be it known that I, GEORGE W. PENNISTON, of North Vernon, in the county of Jennings and State of Indiana, have invented certain new and useful Improvements in Presses for Pressing Hay, Hemp, &c.; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is an elevation of a press with my improvement. Fig. 2 is a plan of my falling doors; Fig. 3, a plan of the concave cylinders.

The nature of my improvement consists in a number of falling doors and a cavity in the plunger to receive them, and passing the hoop on concave cylinder round the bale.

In the accompanying drawings, Fig. 1, letter A is the base of a press-box. The planking of the sides is secured to the ends by bolts; letter B, bale when lifted from the press-box; letter C, door made very strong to secure the bale when pressing; letter D, clevis-bar made very strong to secure the doors when pressing the bale; letter E, the bar to prevent the press from spreading when pressing the bale; letters F F, the sides grooved on the under side to receive the falling doors when pressing the bale; letter G, the plunger made very strong, secured by a strong bolt to the ends of levers N N; letter H, the roller for passing over the trace-chains lifting the bale out of the press-box; letters I I I, the falling doors made with hand-holes to lift them from the cavity of the plunger; letter J, the beveled side of the press-box secured to the door C. The spring of the hay or hemp on door C lifts the beveled sides, relieves the pressure on the ends of the bale, the trace-chains lifting the bale out of press-box, with ease; letters K K, the ends of press-box, made very strong and secured very firm to the sides; letter L, Fig. 3, the concave cylinders, the surface made smooth, the ends of hoop passing freely round the bale, letter M showing the passage of the hoops round the bale. Letters N N are the levers connected to the three toggle-bars by a very strong pin. The lower ends of the toggle-bars O O O are fastened to the rock-shaft, the rock-shaft turning in two blocks on the sides of the press-blocks; letters P P, the chains for lifting the bale out of the press-box. Letter Q, Fig. 3, shows the cavity in the plunger to receive the falling doors when the bale is pressing; letter R, Fig. 1, a rope made fast to the lower ends of lever, the other end made fast to the trace-chains. The plunger, being drawn back, tightens the rope, lifting the bale out of press-box; letters S S S, the rope for operating levers to press the bale. Letter T shows the cavity in the plunger for receiving the falling doors when the bale is being pressed. Two grooves are made in the end and bottom of the press-box to receive two trace-chains, so that the hay or hemp pass over them; letters R, Fig. 1, a hook made fast to the end of the rope, the other end made fast to the lower end of lever N N. Lifting the bale, when the plunger is drawn back, out of the press-box with ease.

To fill this press, the doors C C, Fig. 1, are opened and the press-box filled with the hay or hemp to be pressed, the doors C C closed, the falling doors I I I lifted from the cavity in the plunger and put under the slide F F. Power is applied to end of the rope S to bring down the toggle-levers, which presses the bale, the weight of toggle-levers adding power in pressing the bale. The clevis-bar D is released from door C. The door being opened, the bale is ready to receive its hoops, the plunger is drawn back, the chains P P pass over the roller H, lifting the bale out of the press.

My improvements make a press and work it with less labor than any other press of the same capacity made prior to the date of my invention.

I will now state what I desire to secure by Letters Patent, viz:

1. The falling doors, Fig. 2, letter I, in connection with slide pieces, Fig. 1, letters F F.

2. A number of concave cylinders, Fig. 3, letter L, for passing the hoop or tie around the bale, which saves the time and labor of making a pit and working under the press-box.

GEORGE W. PENNISTON.

Witnesses:
JAMES W. KYLE,
JOHN McCARNAN,
JAMES M. MAYFIELD.